(12) United States Patent
Chaumonnot et al.

(10) Patent No.: US 9,079,774 B2
(45) Date of Patent: *Jul. 14, 2015

(54) INORGANIC MATERIAL MADE OF SPHERICAL PARTICLES OF SPECIFIC SIZE AND HAVING METALLIC NANOPARTICLES TRAPPED IN A MESOSTRUCTURED MATRIX

(75) Inventors: Alexandra Chaumonnot, Lyons (FR); Aurélie Coupe, Noisiel (FR); Clément Sanchez, Gif-sur-Yvette (FR); Cédric Boissiere, Paris (FR); Michel Martin, Lyons (FR)

(73) Assignee: IFP ENERGIES NOUVELLES, Rueil-Malmaison Cedax (FR)

( * ) Notice: Subject to any disclaimer, the term of this patent is extended or adjusted under 35 U.S.C. 154(b) by 1290 days.

This patent is subject to a terminal disclaimer.

(21) Appl. No.: 12/935,436

(22) PCT Filed: Feb. 26, 2009

(86) PCT No.: PCT/FR2009/000208
§ 371 (c)(1),
(2), (4) Date: May 3, 2011

(87) PCT Pub. No.: WO2009/130401
PCT Pub. Date: Oct. 29, 2009

(65) Prior Publication Data
US 2011/0293941 A1 Dec. 1, 2011

(30) Foreign Application Priority Data
Mar. 31, 2008 (FR) ...................................... 08 01762

(51) Int. Cl.
*C01B 37/00* (2006.01)
*C01B 39/04* (2006.01)
*B01J 21/02* (2006.01)
*B01J 21/06* (2006.01)
*B01J 29/06* (2006.01)

(52) U.S. Cl.
CPC ................ *C01B 37/00* (2013.01); *B01J 21/02* (2013.01); *B01J 21/063* (2013.01); *B01J 29/061* (2013.01); *C01B 37/005* (2013.01); *C01B 39/04* (2013.01); *Y10T 428/2991* (2015.01); *Y10T 428/2993* (2015.01)

(58) Field of Classification Search
None
See application file for complete search history.

(56) References Cited

U.S. PATENT DOCUMENTS

| | | | |
|---|---|---|---|
| 6,592,764 B1 | 7/2003 | Stucky et al. | |
| 6,660,686 B2 * | 12/2003 | Inagaki et al. | ................. 502/349 |
| 6,669,924 B1 | 12/2003 | Kaliaguine et al. | |
| 7,807,598 B2 | 10/2010 | Euzen et al. | |
| 8,226,740 B2 * | 7/2012 | Chaumonnot et al. | .......... 75/252 |
| 2004/0144318 A1 | 7/2004 | Beck et al. | |
| 2005/0239634 A1 * | 10/2005 | Ying et al. | ...................... 502/64 |
| 2006/0030477 A1 | 2/2006 | Chaumonnot et al. | |
| 2006/0292054 A1 * | 12/2006 | Chaumonnot et al. | ..... 423/328.1 |
| 2007/0227351 A1 * | 10/2007 | Garcia-Martinez | ............... 95/90 |

FOREIGN PATENT DOCUMENTS

| | | |
|---|---|---|
| EP | 1627853 A1 | 2/2006 |
| WO | 2006128988 A1 | 12/2006 |

OTHER PUBLICATIONS

Dolores Perez, M. et al., "Growth of gold nanoparticle arrays in TiO2 mesoporous matrixes," Langmuir, 2004, pp. 6879-6886, vol. 20.
Grosso, D. et al., "Periodically ordered nanoscale islands and mesoporous films composed of nanocrystalline mutlimetallic oxides," Nature Materials, Nov. 2004, pp. 787-792, vol. 3.
Maas, H. et al., "Encapsulated lanthanides as luminescent materials," Angew. Chem. Int. Ed., 2002, pp. 2495-2497, vol. 41, No. 14.
Prokesova, P. et al., "Preparation of nanosized micro/mesoporous composites via simultaneous synthesis of Beta/MCM-48 phases," Mesoporous and Microporous Materials, 2003, pp. 165-174, vol. 64.
Schneeweiss, O. et al., "Novel solid-state synthesis of alpha-Fe and Fe3O4 nanoparticles embedded in a MgO matrix," Nanotechnology, 2006, pp. 607-616, vol. 17.
World IP Organization. "International Search Report and Written Opinion." PCT/FR2009/000208. Applicant: IFP, Mailed Oct. 6, 2009.

* cited by examiner

*Primary Examiner* — George Wyszomierski
(74) *Attorney, Agent, or Firm* — Millen, White, Zelano & Branigan, P.C.

(57) ABSTRACT

An inorganic material is described, which consists of at least two elementary spherical particles, each one of said spherical particles comprising metallic nanoparticles of size ranging between 1 and 300 nm and a mesostructured matrix based on an oxide of at least one element X selected from the group made up of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium, and the mixture of at least two of these elements, said mesostructured matrix having a pore diameter ranging between 1.5 and 30 nm and having amorphous walls of thickness ranging between 1 and 30 nm, said elementary spherical particles having a diameter D greater than 10 μm and less than or equal to 100 μm. Said material can also contain zeolite nanocrystals trapped within said mesostructured matrix.

24 Claims, No Drawings

INORGANIC MATERIAL MADE OF SPHERICAL PARTICLES OF SPECIFIC SIZE AND HAVING METALLIC NANOPARTICLES TRAPPED IN A MESOSTRUCTURED MATRIX

FIELD OF THE INVENTION

The present invention relates to the field of inorganic oxide materials, notably those containing transition and/or rare earth metals, with organized and uniform porosity in the mesoporosity domain. It also relates to the preparation of these materials that are obtained using the EISA (Evaporation Induced by Self-Assembly) method.

BACKGROUND OF THE INVENTION

New synthesis strategies allowing to obtain materials of well-defined porosity in a very wide range, from microporous materials to macroporous materials to hierarchical porosity materials, i.e. having pores of several sizes, have known a very large development within the scientific community since the mid-90s (G. J. de A. A. Soler-Illia, C. Sanchez, B. Lebeau, J. Patarin, Chem. Rev., 2002, 102, 4093). Materials whose pore size is controlled are obtained. In particular, the development of synthesis methods referred to as "soft chemistry" has led to the elaboration of mesostructured materials at low temperature through the co-existence, in aqueous solution or in polar solvents, of inorganic precursors with structuring agents, generally molecular or supramolecular surfactants, ionic or neutral. Control of electrostatic interactions or through hydrogen bonds between the inorganic precursors and the structuring agent jointly linked with hydrolysis/condensation reactions of the inorganic precursor leads to a cooperative assembly of the organic and inorganic phases generating micelle aggregates of surfactants of uniform and controlled size within an inorganic matrix. This cooperative self-assembly phenomenon governed, among other things, by the structuring agent concentration, can be induced by progressive evaporation of a solution of reactants whose structuring agent concentration is in most cases lower than the critical micelle concentration, which leads to either the formation of mesostructured films in the case of a deposition on substrate (dip-coating technique) or to the formation of a mesostructured powder after atomization (aerosol technique) or draining of the solution. By way of example, U.S. Pat. No. 6,387,453 discloses the formation of mesostructured organic-inorganic hybrid films by means of the dip-coating technique, and these authors have furthermore used the aerosol technique to elaborate mesostructured purely silicic materials (C. J. Brinker, Y. Lu, A. Sellinger, H. Fan, Adv. Mat., 1999, 11, 7). Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed. For example, the M41S family initially developed by Mobil (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834), consisting of mesoporous materials obtained using ionic surfactants such as quaternary ammonium salts, having a generally hexagonal, cubic or lamellar structure, pores of uniform diameter ranging from 1.5 to 10 nm and amorphous walls of thickness of the order of 1 to 2 nm, has been widely studied. Later, structuring agents of a different chemical nature have been used as amphiphilic macromolecules of block copolymer type, the latter leading to mesostructured materials having a generally hexagonal, cubic or lamellar structure, pores of uniform diameter ranging from 4 to 50 nm and amorphous walls of thickness ranging from 3 to 7 nm.

In addition to the synthesis techniques using dip-coating or formation of a powder (aerosol/draining) described above, which use the phenomenon of progressive concentration of the inorganic precursors and of the structuring agent within the solution where they are present, the mesostructured materials can be obtained by direct precipitation within an aqueous solution or in solvents of marked polarity by using the value of the critical micelle concentration of the structuring agent. Generally, synthesis of these materials obtained by precipitation requires a ripening stage in an autoclave and all the reactants are not integrated in the products in stoichiometric proportion since they can be found in the supernatent. Depending on the structure and on the organization degree required for the final mesostructured material, these syntheses can take place in an acid medium (pH≤1) (WO-99/37,705) or in a neutral medium (WO-96/39,357), the nature of the structuring agent used also playing an essential part. The elementary particles thus obtained have no regular shape and they are generally characterized by a size well above 500 nm.

The discovery of these materials of uniform and organized porosity has opened up new prospects as regards the elaboration of innovative solids for potential applications in such varied spheres as catalysis, chemical molecules separation, as well as optics, electronics and biochemistry. In particular, the study of the introduction of metallic nanoparticles in essentially silicic mesostructured oxide matrices has led to a large number of publications and patents. In fact, using such a host network during the synthesis of metallic nanoparticles has contributed to the following scientific advances: better control of the size and of the morphology of the metallic nanoparticles leading, in the sphere of catalysis for example, to new activities and selectivities according to the reactions studied, and better dispersion of the metallic nanoparticles within the support by means of a promoted diffusion of the metallic precursors due to the organization of the host network porosity. One of the conventional methods allowing incorporation of the metallic nanoparticles in a mesostructured silicic network consists in synthesizing, in a first stage, the host network according to the synthesis methods described above, then, in a second stage, in forming within the porosity thus created metallic nanoparticles according to the following non-exhaustive methods: impregnation of precursor inorganic salts, exchanges of metallic ions with ions present at the surface of the host network, grafting of organometallic complexes, metallic crystallites (also referred to as clusters) or preformed nanoparticles stabilized by organic ligands, etc. This method also allows elaboration of mesostructured essentially silicic solids having, within their pores, nanoparticles of gold, noble metals, iron oxide, silver oxide, etc. (A. Fukuoka, H. Araki, Y. Sakamoto, S. Inagaki, Y. Fukushima, M. Ichikawa, Inorganica Chimica Acta, 2003, 350, 371; S. Behrens, G. Spittel, Dalton Trans., 2005, 868; K.-J. Chao, M.-H. Cheng, Y.-F. Ho, P.-H. Liu, Catalysis Today, 2004, 97, 49; M. Fröba, R. Köhn, G. Bouffaud, Chem. Mater., 1999, 11, 2858). Another option consists in introducing the desired nanoparticles directly upon elaboration of the mesostructured host network. It is thus possible to introduce in the micelles formed by the structuring agent, during synthesis, metallic nanoparticle precursors by using their hydrophobic or electrostatic properties (G. Lü, D. Ji, G. Qian, Y. Qi, X. Wang, J. Suo, Applied Catalysis A: General, 2005, 280, 175;

Ö. Dag, O. Samarskaya, N. Coombs, G. A. Ozin, *J. Mater. Chem.*, 2003, 13, 328). All these methods however lead to partial or even total obstruction of the porosity of the mesostructured matrix, which eventually does not allow to take advantage of both the textural and/or structural properties of the mesostructuration and of the metallic nanoparticles.

SUMMARY OF THE INVENTION

The invention relates to a material consisting of at least two elementary spherical particles, each one of said spherical particles comprising metallic nanoparticles of size ranging between 1 and 300 nm and a mesostructured matrix based on an oxide of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, said mesostructured matrix having a pore size ranging between 1.5 and 30 nm and having amorphous walls of thickness ranging between 1 and 30 nm, said elementary spherical particles having a diameter D greater than 10 μm and less than or equal to 100 μm (10<D (μm)≤100). What is referred to as metallic nanoparticles means particles of nanometric size comprising at least one metal belonging to the transition metal family (columns 3 to 12 of the periodic table according to the IUPAC classification) and/or to the rare earth metal family (lanthanides and actinides). The material according to the invention can also contain, in addition to the metallic nanoparticles, zeolite nanocrystals trapped in the mesostructured oxide matrix, said zeolite nanocrystals having a pore opening ranging between 0.2 and 2 nm.

The present invention also relates to the preparation of the material according to the invention. A method of preparing the material according to the invention, referred to as "main preparation method according to the invention", comprises a) synthesizing metallic particles of maximum nanometric size equal to 300 nm in order to obtain a stable colloidal solution in which said nanoparticles are dispersed; b) mixing into a solution at least one surfactant, at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one stable colloidal solution of metallic nanoparticles obtained according to a), and optionally at least one stable colloidal solution in which zeolite crystals of maximum nanometric size equal to 300 nm are dispersed; c) aerosol atomizing the solution obtained in stage b) using a spray nozzle that leads to the formation of liquid droplets of diameter less than or equal to 300 μm; d) drying said droplets; e) crushing the solid product obtained in stage d); f) mixing into a solution at least one surfactant, at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one stable colloidal solution of metallic nanoparticles obtained according to a), optionally at least one stable colloidal solution in which zeolite crystals of maximum nanometric size equal to 300 nm are dispersed and at least a fraction of the solid product obtained in stage e) so as to form a suspension; g) aerosol atomizing the solution obtained in stage f) using a spray nozzle that leads to the formation of suspended droplets, which are precursors of the constituent spherical elementary particles of diameter D such that 10<D (μm)≤100 of the material according to the invention; h) drying said droplets obtained in stage g) and i) removing said surfactant introduced in stages b) and f) so as to obtain a mesostructured material in which metallic nanoparticles are trapped.

The ordered structure of the matrix of the material according to the invention is due to the micellization or self-assembly phenomenon induced by the EISA method.

Relevance of the Invention

The material according to the invention, which consists of spherical particles comprising metallic nanoparticles trapped in a mesostructured matrix, with amorphous walls, based on an oxide of at least said element X, simultaneously has the structural, hydro-dehydrogenizing and redox properties specific to the metallic particles and the structural, textural and possibly acido-basicity and redox properties specific to the materials based on an oxide of at least said element X. The elaboration, on the "submicronic" scale, of a composite oxide material consisting of a mesostructured matrix and of metallic nanoparticles leads to a privileged connection of the metallic nanoparticles and of the uniform and organized mesoporosity of the oxide matrix within a single spherical particle.

The material according to the invention consists of spherical elementary particles having a diameter D such that 10<D (μm)≤100 and preferably D ranges between 11 and 70 μm. The controllable size of these particles resulting from the implementation and the control of the EISA method by the applicant, as well as their perfectly spherical shape, allow better control of the diffusion of the compounds when using the material according to the invention in potential industrial applications.

On the other hand, the method of preparing the material according to the invention that consists in causing interaction, preferably in an acidic medium, between at least one surfactant, ionic or non-ionic, and at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one colloidal solution in which metallic particles of maximum nanometric size equal to 300 nm are dispersed, and optionally at least one colloidal solution in which zeolite crystals of maximum nanometric size equal to 300 nm are dispersed, the ordered structure of the material being due to the phenomenon of micellization or self-assembly induced by the EISA method, allows to readily elaborate mesostructured composite materials/metallic particles possibly comprising zeolite nanocrystals and to work with a wide range of metallic nanoparticles and optionally of zeolite nanocrystals, whatever their initial synthesis methods provided that said particles, optionally said crystals, have the property of dispersing in solution, notably an acid solution and more preferably an acid aquo-organic solution, in form of particles, possibly in form of zeolite crystals, of maximum nanometric size equal to 300 nm.

Besides, the possible trapping of zeolite nanocrystals in the mesostructured oxide matrix in addition to that of the metallic nanoparticles allows to elaborate, via a one-pot synthesis method, materials having simultaneously an acid function and a hydro-dehydrogenizing function exhibiting privileged connections due to the size and the morphology of the elementary spherical particles and the mesostructuration of the oxide matrix.

Furthermore, in relation to known mesostructured material syntheses, preparation of the material according to the invention is carried out on a continuous basis, the preparation time is reduced (some hours, as opposed to 12 to 24 hours when using autoclaving) and the stoichiometry of the non-volatile species present in the initial reactant solution is maintained in the material of the invention.

DETAILED DESCRIPTION

The object of the present invention is an inorganic material consisting of at least two elementary spherical particles, each one of said spherical particles comprising metallic nanoparticles of size ranging between 1 and 300 nm and a mesostructured matrix based on an oxide of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, and the mixture of at least two of these elements, said mesostructured matrix having a pore diameter ranging between 1.5 and 30 nm and having amorphous walls of thickness ranging between 1 and 30 nm, said elementary spherical particles having a diameter D greater than 10 μm and less than or equal to 100 μm (10<D (μm)≤100).

According to the invention, element X present in form of an oxide in the mesostructured matrix contained in each one of said spherical particles of the material according to the invention is selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, and the mixture of at least two of these elements, and preferably element X present in form of an oxide is selected from the group made up of silicon, aluminium, titanium, zirconium, gallium, germanium and cerium, and the mixture of at least two of these elements. Said matrix based on an oxide of at least said element X is mesostructured: if exhibits mesopores having a uniform diameter ranging between 1.5 and 30 nm, preferably between 1.5 and 10 nm, homogeneously and evenly distributed in each one of said particles. The matter contained between the mesopores of the mesostructured matrix is amorphous and forms walls whose thickness ranges between 1 and 30 nm. The wall thickness corresponds to the distance between a first mesopore and a second mesopore, the second mesopore being the closest pore to said first mesopore. The organization of the mesoporosity described above leads to a structuration of said matrix that can be lamellar, hexagonal, vermicular, cubic, cholesteric or bicontinuous, preferably vermicular. It can be noted that a porosity of microporous nature can also result from the imbrication of the surfactant used during preparation of the material according to the invention with the inorganic wall at the level of the organic-inorganic interface developed upon mesostructuration of the inorganic component of said material according to the invention. The material according to the invention also has an interparticular textural macroporosity.

The mesostructured matrix present in each elementary spherical particle of the material according to the invention is based on an oxide of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, and the mixture of at least two of these elements, and preferably said element X present in form of an oxide is selected from the group made up of silicon, aluminium, titanium, zirconium, gallium, germanium and cerium, and the mixture of at least two of these elements. According to the invention, said mesostructured matrix advantageously consists of a first element X selected from among silicon, aluminium, titanium, zirconium, gallium, germanium and cerium, and of a second element X, different from said first element X, selected from among silicon, aluminium, titanium, zirconium, gallium, germanium and cerium. More preferably, said mesostructured matrix is based on a silicon oxide and on an aluminium oxide, or on a silicon oxide and a zirconium oxide. According to the invention, when said mesostructured matrix is based on oxides of a first element X and of a second element X, different from said first element X, the proportion of first element X in relation to that of second element X in the composition of the matrix is variable.

According to the invention, what is referred to as metallic nanoparticles means particles of nanometric size comprising at least one metal belonging to the transition metal family (columns 3 to 12 of the periodic table according to the IUPAC classification) and/or to the rare earth metal family (lanthanides and actinides). More precisely, said metallic nanoparticles trapped in the mesostructured matrix present in each elementary spherical particle of the material according to the invention comprise, according to a first embodiment of said particles, at least one transition metal of zero oxidation degree belonging to the following non-exhaustive list: Au, Pd, Pt, Ni, Co, Cu, Ag, Rh, Ru, Ir, Fe, mixtures and derived alloys thereof. Said transition metal is preferably selected from among gold, palladium, platinum, nickel, cobalt, iron, ruthenium, rhodium and mixtures thereof, and more preferably said transition metal is iron or gold. Said metallic nanoparticles comprise, according to a second embodiment thereof, at least one transition metal oxide and/or at least one rare earth metal oxide, wherein said metal belongs to the following non-exhaustive list: Ti, Zr, Nb, Ta, Mo, W, Fe, Co, Cu, Y, La, Ni, Cr, Pd, Pt, Ce, Eu, Nd, Gd and mixtures thereof. The metal of at least said transition metal oxide and/or the metal of at least said rare earth metal oxide preferably belongs to the following list: Ti, Zr, Nb, Mo, W, Co, Ni, Ce and mixtures thereof. Furthermore, the metallic oxide nanoparticles described according to the second embodiment of said metallic particles can optionally additionally contain the element silicon in addition to the metallic element. The metallic nanoparticles contain, according to a third embodiment, at least one polymetallic oxide with a crystallographic structure of spinel $AB_2O_4$, perovskite $ABO_3$ or ilmenite $ABO_3$ type, A and/or B being at least one transition and/or rare earth metal. In the spinel type structure, A and B are respectively divalent and trivalent cations, and in the perovskite type structure, A and B are respectively divalent and tetravalent cations. A or B can optionally be a metal from groups 1 and 2 of the periodic table according to the IUPAC classification when A or B is neither a transition metal nor a rare earth metal. As regards ilmenite $ABO_3$, elements A and B have similar sizes and they are defined by the sum of their charges equal to +6. By way of non-exhaustive example, spinel type mixed metallic oxides are preferably compounds $Fe_3O_4$, $MgFe_2O_4$, $ZnFe_2O_4$, $Co_3O_4$, the perovskite type mixed metallic oxides are preferably compounds $BaTiO_3$, $CaTiO_3$, $SrZnO_3$, $SrTiO_3$, $LaFeO_3$, $LaCeCoO_3$, $SrHfO_3$, $SrSnO_3$, $BaSnO_3$, and the ilmenite type mixed metallic oxides are notably compounds $NiMnO_3$ and FeTiO$_3$. According to this third embodiment of said metallic nanoparticles, several polymetallic oxides of different types (spinel, perovskite, ilmenite) can be trapped in the mesostructured matrix of a spherical particle. Said metallic nanoparticles comprise, according to a fourth embodiment, at least one chalcogenide made up of a transition metal M and a chalcogen element C selected from among sulfur, selenium and tellurium, preferably sulfur. The metallic chalcogenides preferably used as metallic nanoparticles belong to the following non-exhaustive list: MoS$_2$, NiS$_x$ (x=1 or 2), Ni$_3$S$_2$, WS$_2$, Co$_9$S$_8$, PtS, PdS, RuS$_2$, Rh$_2$S$_3$, NbS$_x$ (x=1, 2 or 3), FeS, FeS$_2$, Au$_2$S, ZnS, CdS and more preferably to the following list: MoS$_2$, NiS$_x$ (x=1 or 2), Ni$_3$S$_2$, WS$_2$, Co$_9$S$_8$, PtS, PdS, RuS$_2$, Rh$_2$S$_3$, NbSx (x=1, 2 or 3).

According to the invention, the metallic nanoparticles advantageously represent from 0.1 to 30 wt. %, preferably 0.1 to 20 wt. % and more preferably 0.1 to 10 wt. % of the material of the invention. The metallic nanoparticles have a maximum size of 300 nm, preferably their size ranges between 1 and 300 nm, more preferably between 2 and 50 nm. Said metallic nanoparticles are trapped in the mesostructured matrix of each elementary spherical particle of the material according to the invention in the form described in one or more of the four embodiments of said nanoparticles described above. In particular, the mesostructured matrix of a spherical particle can trap metallic nanoparticles present in several forms according to the embodiments of said metallic nanoparticles described above. First metallic nanoparticles present in one of the forms described above in one of the four embodiments and second metallic nanoparticles present in another form (selected from among one of the forms described above in one of the four embodiments) than that of said first nanoparticles can be trapped within the mesostructured matrix of a spherical particle. For example, a transition metal of zero oxidation degree according to the form taken by the metallic nanoparticles in accordance with the first embodiment described above and a transition metal oxide according to the form taken by the metallic nanoparticles in accordance with the second embodiment described above can be trapped in the mesostructured matrix of an elementary spherical particle of the material according to the invention.

Advantageously, each spherical particle also comprises zeolite nanocrystals. Said zeolite nanocrystals are trapped with the metallic nanoparticles in the mesostructured matrix contained in each elementary spherical particle. According to this embodiment of the invention consisting in trapping zeolite nanocrystals in the mesostructured matrix, the material according to the invention simultaneously exhibits, in each elementary spherical particle, a mesoporosity within the matrix itself (mesopores of uniform size ranging between 1.5 and 30 nm, preferably between 1.5 and 10 nm) and a zeolite type microporosity generated by the zeolite nanocrystals trapped in the mesostructured matrix. Said zeolite nanocrystals have a pore opening size ranging between 0.2 and 2 nm, preferably between 0.2 and 1 nm, and more preferably between 0.2 and 0.6 nm. Said zeolite nanocrystals advantageously represent 0.1 to 30 wt. %, preferably 0.1 to 20 wt. % and more preferably 0.1 to 10 wt. % of the material according to the invention. The zeolite nanocrystals have a maximum size of 300 nm and their size preferably ranges between 10 and 100 nm. Any zeolite and in particular, but in a non-exhaustive manner, those listed in "*Atlas of zeolite framework types*", 6$^{th}$ revised Edition, 2007, C. Baerlocher, L. B. McCusker, D. H. Olson, can be used in the zeolite nanocrystals present in each elementary spherical particle making up the material according to the invention. The zeolite nanocrystals preferably comprise at least one zeolite selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, Mordenite, NU-87, NU-88, NU-86, NU-85, IM-5, IM-12, Ferrierite and EU-1. More preferably, the zeolite nanocrystals comprise at least one zeolite selected from among the MFI, BEA, FAU and LTA structural type. Nanocrystals of different zeolites and notably zeolites of different structural types can be present in each spherical particle making up the material according to the invention. In particular, each spherical particle making up the material according to the invention can advantageously comprise at least first zeolite nanocrystals whose zeolite is selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, Mordenite, NU-87, NU-88, NU-86, NU-85, IM-5, IM-12, Ferrierite and EU-1, preferably from among the zeolites of MFI, BEA, FAU and LTA structural type, and at least second zeolite nanocrystals whose zeolite is different from that of the first zeolite nanocrystals and selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, Mordenite, NU-87, NU-88, NU-86, NU-85, IM-5, IM-12, Ferrierite and EU-1, preferably from among the zeolites of MFI, BEA, FAU and LTA structural type. The zeolite nanocrystals advantageously comprise at least one zeolite either entirely silicic or containing, in addition to silicon, at least one element T selected from among aluminium, iron, boron, indium and gallium, preferably aluminium.

According to the invention, said elementary spherical particles making up the material according to the invention have a diameter, expressed in micron, strictly above 10 μm and less than or equal to 100 μm (10<D (μm)≤100). Preferably, diameter D of said spherical particles advantageously ranges between 11 and 70 μm. According to a particular embodiment of the material according to the invention, said elementary spherical particles have a diameter D ranging between 11 and 50 μm, more preferably between 15 and 50 μm. More precisely, said elementary spherical particles are present in the material according to the invention in form of aggregates. The material according to the invention advantageously has a specific surface area ranging between 100 and 1100 m$^2$/g, more advantageously between 200 and 600 m$^2$/g.

The object of the present invention also is the preparation of the material according to the invention. A method of preparing the material according to the invention, referred to as "main preparation method according to the invention", comprises a) synthesizing metallic particles of maximum nanometric size equal to 300 nm in order to obtain a stable colloidal solution in which said nanoparticles are dispersed; b) mixing into a solution at least one surfactant, at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one stable colloidal solution of metallic nanoparticles obtained according to a), and optionally at least one stable colloidal solution in which zeolite crystals of maximum nanometric size equal to 300 nm are dispersed; c) aerosol atomizing the solution obtained in stage b) using a spray nozzle that leads to the formation of liquid droplets of diameter less than or equal to 300 μm; d) drying said droplets; e) crushing the solid product obtained in stage d); f) mixing into a solution at least one surfactant, at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one stable colloidal solution of metallic nanoparticles obtained according to a), optionally at least one stable colloidal solution in which zeolite crystals of maximum nanometric size equal to 300 nm are dispersed and at least a fraction of the solid product obtained in stage e) so as to form a suspension; g) aerosol atomizing the solution obtained in stage f) using a spray nozzle that leads to the formation of suspended droplets, which are precursors of the constituent spherical elementary particles of diameter D such that 10<D (μm)≤100 of the material according to the invention; h) drying said droplets obtained in stage g) and i) removing said surfactant introduced in stages b) and f) so as to obtain a mesostructured material in which metallic nanoparticles are trapped.

The volume percentage of non-volatile compounds present in the suspension according to stage f) of the main preparation method of the invention is at least 7%, preferably at least 7.5% and more preferably at least 10%. Said volume percentage of non-volatile compounds is defined as the ratio of the volume occupied by the non-volatile inorganic fraction in form of condensed oxide(s) in each elementary spherical particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in each elementary spherical particle, i.e. at least one oxide, metallic nanoparticles and optionally zeolite nanocrystals coming respectively from at least one precursor of an element X, from the stable colloidal solution containing the metallic nanoparticles and optionally from the stable colloidal solution containing the zeolite nanocrystals present in stage b) and stage f) of the main preparation method according to the invention, plus the inorganic fraction of the solid product of stage e) of the main preparation method according to the invention. $\rho_{inorg}$ is the density associated with the various inorganic constituents and it is readily accessible to the person skilled in the art. Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage b) and stage f) of the main preparation method according to the invention, plus the organic fraction of the solid product of stage e) of the main preparation method according to the invention. The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

According to the main preparation method of the invention, the fraction of solid product obtained in stage e) and used for carrying out said stage f) represents 1 to 100 wt. %, preferably 1 to 80 wt. % and more preferably 5 to 50 wt. % of the total amount of solid product crushed in stage e).

According to a first particular embodiment of the main preparation method of the invention, only part of the solid product from stage d) is crushed during stage e) of the method of the invention; the non-crushed part is generally not used later.

According to a second particular embodiment of the main preparation method of the invention, a surfactant removal stage i) is carried out prior to the crushing stage according to stage e) so that said stage e) is conducted on a solid product free of organic surfactants. Stages a), b), c), d), i), e), f) and g) have become consecutive in the particular case of said second preparation method according to the invention and they are followed by a new cycle of droplet drying and removal of the surfactant introduced in stage f) as described according to stages h) and i).

For the particular case of the material according to the invention consisting of elementary spherical particles having a diameter D ranging between 11 and 50 μm, preferably between 15 and 50 μm, a simplified preparation method, referred to as "simplified preparation method according to the invention", is preferably carried out, which comprises the following stages: a) synthesizing metallic particles of maximum nanometric size equal to 300 nm in order to obtain a stable colloidal solution in which said nanoparticles are dispersed; b) mixing into a solution at least one surfactant, at least one precursor of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, at least one stable colloidal solution of metallic nanoparticles obtained according to a), and optionally at least one stable colloidal solution in which zeolite crystals of maximum nanometric size equal to 300 nm are dispersed; c) aerosol atomizing the solution obtained in stage b) using a spray nozzle that leads to the formation of liquid droplets of diameter less than or equal to 300 μm; d) drying said droplets; and i) removing said surfactant introduced in stage b) so as to obtain a mesostructured material in which metallic nanoparticles are trapped.

According to said simplified method, the volume percentage of non-volatile compounds present in the solution according to stage b) of the simplified preparation method of the invention is at least 7%, preferably at least 7.5% and more preferably at least 10%. Said volume percentage of non-volatile compounds is defined as the ratio of the volume occupied by the non-volatile inorganic fraction in form of condensed oxide(s) in each solid elementary spherical particle obtained after atomization, plus the volume occupied by the non-volatile organic fraction found in the same solid particle (surfactant) to the total volume, multiplied by 100. More precisely, the volume occupied by the non-volatile inorganic fraction $V_{inorg}$ is defined by ratio $m_{inorg}/\rho_{inorg}$ with $m_{inorg}$=final mass of the inorganic fraction in form of condensed oxide(s) present in each elementary spherical particle, i.e. at least one oxide, metallic nanoparticles and optionally zeolite nanocrystals coming respectively from at least one precursor of an element X, from the stable colloidal solution containing the metallic nanoparticles and optionally from the stable colloidal solution containing the zeolite nanocrystals present in stage b) of the simplified preparation method according to the invention. $\rho_{inorg}$ is the density associated with the various inorganic constituents and it is readily accessible to the person skilled in the art. Similarly, the volume occupied by the non-volatile organic fraction $V_{org}$ is defined by ratio $m_{org}/\rho_{org}$ with $m_{org}$=mass of surfactant present in each elementary spherical particle, i.e. the surfactant present in stage b) of the simplified preparation method according to the invention. The total volume is such that $V_T=V_{inorg}+V_{org}+V_{solvent}$, $V_{inorg}$ and $V_{org}$ being defined above, and $V_{solvent}$ corresponds to the total volume of solvent consisting of water and optionally of an organic solvent.

According to stage a) of the main preparation method of the invention or to stage a) of the simplified preparation method of the invention, said metallic nanoparticles, dispersed in a colloidal solution, are obtained via synthesis protocols known to the person skilled in the art. Thus, the nanoparticles dispersed in a colloidal solution, comprising at least one transition metal of zero oxidation degree (first embodiment of the nanoparticles described above), are generally elaborated by reduction of an inorganic salt of said transition metal, said salt coming advantageously in the form $MZ_n$, where M is said transition metal, Z=Cl or Br and n=2 or 3, by a chemical reducer soluble in an organic or aqueous medium, such as a hydrotriorganoboride, a borohydride, a hydrazine, an alcohol (methanol, ethanol, polyol), an organic compound (aldehyde, ketone, glucose, citrate, etc.), or a reducing gas (hydrogen, carbon monoxide) (H. Bonnemann, W. Brijoux, R. Brinkmann, E. Dinjus, T. Jouber, R. B. Korall, *Angew. Chem. Int. Ed. Engl.*, 1991, 30, 10, 1312; Y. Nakao, S. Fugishige, *J. of Catal.*, 1992, 74, 323; H. Hirai, *J. Macromol. Sci. Chem.*, 1979, A13, 5, 633; N. Toshima, T. Takahashi, H. Hirai, *Chem. Lett.*, 1985, 1245). A variant of this method consists in elaborating said nanoparticles from a water micro-emulsion in an organic phase (M. Boutonnet, J. Kizling, P. Stenius, G. Maire, *Coll. And Surf.*, 1982, 5, 209). It is also possible to obtain a colloidal solution in which said metallic nanoparticles are dispersed in form of at least one transition metal of zero oxidation degree through thermal decomposition of an organometallic complex of said transition metal (T. Tano, K. Esumi, K. Meguro, *J. Coll. And interface Sci.*, 1989, 133, 2, 530), by condensation in vapour phase (vaporization of the metal atoms, then trapping thereof in solvents cooled in liquid nitrogen) (K. J. Klabunde, *Platinium Metals Rev.*, 1992, 36, 2, 80), by photoreduction, radiolysis or electrochemical reduction (N. Toshima, T. Takahashi, H. Hirai, *Chem. Lett.*, 1985, 1245; M. Mostafavi, N. Keghouche, M. O. Delcourt, J. Belloni, *Chem. Physics Lett.*, 1990, 167, 3, 193; M. T. Reetz, W. Helbig, *J. am. Chem. Soc.*, 1994, 116, 7401). The dispersion in solution of the metallic nanoparticles can be provided via the presence of stabilizing agents such as, for example, polymers (polyvinylic alcohol, polystyrene, polyethylene) or copolymers or anionic surfactants (sodium dodecylsulfate) or cationic surfactants (dodecyltrimethylammonium chloride) or by the solvent itself used for carrying out stage a) of the main preparation method according to the invention or stage a) of the simplified preparation method according to the invention.

The metallic nanoparticles, dispersed in a colloidal solution, comprising at least one transition metal oxide and/or at least one rare earth metal oxide (second embodiment of the metallic nanoparticles described above) or comprising at least one polymetallic oxide (third embodiment of the metallic nanoparticles described above), can be obtained by means of a first method consisting of a stage of hydroxylation of a metallic cation from the salt of said transition metal or rare earth metal by acid-base reaction (addition of an acid or of a base), or by thermohydrolysis reaction, followed by a condensation stage involving olation or oxolation reactions that lead to the nanoparticles. It is also possible to obtain these metallic nanoparticles in form of at least one transition metal oxide and/or at least one rare earth metal oxide or in form of at least one polymetallic oxide, dispersed in a colloidal solution, by means of a second method carried out from reactions of hydrolysis and condensation of alkoxide precursors of said metal of formula $M(OR)_n$ where M is a transition metal or a rare earth metal and R is an alkyl group, generally controlled by the presence in solution of a complexing agent (sol-gel process). The person skilled in the art wishing to carry out one or the other of these methods can refer for information to the following publications: J-P. Jolivet, *Metal Oxyde Chemistry and Synthesis. From Solution to Solid State*, J. Wiley and Sons, Chichester, 2000; F. Schüth, K. S. W. Sing, J. Weitkamp, *Handbook of Porous Solids*, Wiley-VCH, 2002, Volume 3; J. Livage, C. Sanchez, *J. Non Cristalline Solids*, 1992, 145, 11. Finally, a third method intended to obtain metallic nanoparticles, dispersed in a colloidal solution, comprising at least one transition metal oxide and/or at least one rare earth metal oxide (second embodiment of the metallic nanoparticles described above) or comprising at least one polymetallic oxide (third embodiment of the metallic nanoparticles described above), consists in carrying out non-hydrolytic methods, generally at low temperature, the systems studied consisting of a metallic precursor (salt or alkoxide) in an organic solvent (benzyl alcohol for example) (M. Niederberger, M. H. Bard, G. D. Stucky, *J. Am. Chem. Soc.,* 2002, 124, 46, 13642).

In cases where said metallic nanoparticles do not only comprise at least one transition metal oxide and/or at least one rare earth metal oxide, but also the element silicon, the latter is introduced via the combination, in the synthesis protocols of one of the three methods described above, of the metallic oxide precursor with a silica precursor, and the latter can be obtained from any silica source and advantageously from a sodium silicate precursor of formula $SiO_2,NaOH$, a chlorine-containing precursor of formula $SiCl_4$, an organometallic precursor of formula $Si(OR)_4$ where R=H, methyl, ethyl, or a chioroalkoxide precursor of formula $Si(OR)_{4-x}Cl_x$ where R=H, methyl, ethyl, x ranging between 0 and 4.

In the particular case where the metallic nanoparticles trapped in the mesostructured matrix based on an oxide of at least one element X comprise at least one transition metal of zero oxidation degree (first embodiment of the nanoparticles), it is possible, instead of synthesizing metallic nanoparticles directly in their reduced form (zero oxidation degree) as described above in accordance with stage a) of the main method according to the invention or of the simplified method according to the invention, to synthesize during said stage a) a stable colloidal solution in which the metallic nanoparticles are dispersed in the oxide form of said transition metal, then to carry out, after stage i) of the main method according to the invention or of the simplified method according to the invention, an additional stage j) consisting in reducing the oxide of said transition metal so that the transition metal of said metallic nanoparticles trapped in said mesostructured matrix of each spherical particle of the material according to the invention has a zero oxidation degree. The reduction techniques used are similar to those previously described and used during stage a) of the main method according to the invention or of the simplified method according to the invention for synthesizing metallic nanoparticles comprising at least one transition metal of zero oxidation degree. In particular, additional stage j) following stage i) of the main preparation method according to the invention or of the simplified preparation method according to the invention can be efficiently carried out by reduction of the metallic nanoparticles comprising at least one transition metal oxide in a reducing gas atmosphere (hydrogen, carbon monoxide) in a temperature range from ambient temperature up to T=800° C., and preferably from ambient temperature up to T=550° C., the gas flow rate considered being set in a range from 0.5 to 10 l/h/g solid, preferably from 0.5 to 5 l/h/g solid.

The metallic nanoparticles dispersed in colloidal solution, comprising at least one transition metal sulfide (fourth embodiment of the metallic nanoparticles described above) can be obtained from the following non-exhaustive synthesis techniques: direct sulfurization of the nanoparticles of said transition metal of zero oxidation degree or in oxidized form (A. Zak, Y. Feldman, V. Alperovich, R. Rosentsveig, R. Tenne, *J. Am. Chem. Soc.*, 2000, 122, 11108), precipitation in non-aqueous solution of a metallic salt of said transition metal in the presence of a sulfurizing agent, thermal decomposition of the salt of said transition metal in aqueous phase such as thiometallates.

Most synthesis methods mentioned above for the synthesis of metallic nanoparticles, dispersed in colloidal solution, in one of the four forms given in the four embodiments of the metallic nanoparticles described above, are described in the article by B. L. Cushing, V. L. Kolesnichenko, C. J. O'Connor, *Chem. Rev.*, 2004, 104, 3893.

According to stage a) of the main preparation method of the invention or of the simplified preparation method of the invention, said metallic nanoparticles according to the invention can also be commercial ones (for example, rare earth (La, Ce, etc.) metal oxide particles provided by Rhodia Electronics and catalysis, titanium oxide particles provided by Millenium Chemicals, etc.).

According to stages b) and f) of the main preparation method of the invention or to stage b) of the simplified preparation method of the invention, the precursor(s) of at least one element X selected from the group made up of silicon, aluminium, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group made up of silicon, aluminium, titanium, zirconium, gallium, germanium and cerium, is (are) an inorganic oxide precursor(s) known to the person skilled in the art. The precursor(s) of at least said element X can be any compound comprising element X and that can release this element in solution, for example in aquo-organic solution, preferably in acid aquo-organic solution, in reactive form. In the preferred case where X is selected from the group made up of silicon, aluminium, titanium, zirconium, gallium, germanium and cerium, and the mixture of at least two of these elements, the precursor(s) of at least said element X is (are) advantageously an inorganic salt of said element X of formula $XZ_n$ (n=3 or 4), Z being a halogen, group $NO_3$ or a perchlorate, Z preferably being chlorine. The precursor(s) of at least said element X considered can also be organometallic precursor(s) of formula $X(OR)_n$ where R=ethyl, isopropyl, n-butyl, s-butyl, t-butyl, etc., or a chelated precursor such as $X(C_5H_8O_2)_n$, with n=3 or 4. The precursor(s) of at least said element X considered can also be an oxide (oxides) or a hydroxide (hydroxides) of said element X. Depending on the nature of element X, the precursor of element X considered can also have the form $XOZ_2$, Z being a monovalent anion such as a halogen or group $NO_3$. Preferably, said element(s) X is (are) selected from the group made up of silicon, aluminium, titanium, zirconium, gallium, germanium and cerium, and the mixture of at least two of these elements. When at least one element X is silicon, said silicic precursor is then obtained from any silica source and advantageously from a sodium silicate precursor of formula $SiO_2,NaOH$, a chlorine-containing precursor of formula $SiCl_4$, an organometallic precursor of formula $Si(OR)_4$ where R=H, methyl, ethyl, or a chloroalkoxide precursor of formula $Si(OR)_{4-x}Cl_x$ where R=H, methyl, ethyl, x ranging between 0 and 4. The silicic precursor can also advantageously be an organometallic precursor of formula $Si(OR)_{4-x}R_x^1$ where R=H, methyl, ethyl, and R' is an alkyl chain or a functionalized alkyl chain, for example by a thiol, amino, β diketone or sulfonic acid group, x ranging between 0 and 4.

The surfactant used to prepare the mixture according to stages b) and f) of the main preparation method of the invention, respectively according to stage b) of the simplified preparation method of the invention, is an ionic or non-ionic surfactant or a mixture thereof. Preferably, the ionic surfactant is selected from among the phosphonium and ammonium ions, more preferably among the quaternary ammonium salts such as cetyltrimethylammonium bromide (CTAB). Preferably, the non-ionic surfactant can be any copolymer having at least two parts of different polarities conferring amphiphilic macromolecule properties on them. These copolymers can comprise at least one block belonging to the non-exhaustive list of the following copolymer families: fluorinated copolymers ($—[CH_2—CH_2—CH_2—CH_2—O—CO—R1-$ with $R1=C_4F_9, C_8F_{17}$, etc.), biological copolymers such as polyamino acids (poly-lysine, alginates, etc.), dendrimers, copolymers consisting of poly(alkylene oxide) chains. Generally speaking, any copolymer of amphiphilic character known to the person skilled in the art can be used (S. Förster, M. Antionnetti, *Adv. Mater*, 1998, 10, 195-217; S. Förster, T. Plantenberg, *Angew. Chem. int. Ed*, 2002, 41, 688-714; H. Cölfen, *Macromoi. Rapid Commun*, 2001, 22, 219-252). Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the blocks consists of a poly(alkylene oxide) chain of hydrophilic nature and the other block consists of a poly(alkylene oxide) chain of hydrophobic nature. For a three-block copolymer, at least one of the blocks consists of a poly(alkylene oxide) chain of hydrophilic nature and at least one of the other blocks consists of a poly(alkylene oxide) chain of hydrophobic nature. Preferably, in the case of a three-block copolymer, the a poly(alkylene oxide) chains of hydrophilic nature are poly(ethylene oxide) chains denoted by $(PEO)_x$ and $(PEO)_z$, and the poly(alkylene oxide) chains of hydrophobic nature are poly(propylene oxide) chains denoted by $(PPO)_y$, poly(butylene oxide) chains or mixed chains each chain of which is a mixture of several alkylene oxide monomers. More preferably, in the case of a three-block copolymer, a compound of formula $(PEO)_x—(PPO)_y—(PEO)_z$ is used, wherein x ranges between 5 and 300, y ranges between 33 and 300 and z ranges between 5 and 300. Preferably, the values of x and z are identical. A compound wherein x=20, y=70 and z=20 (P123) and a compound wherein x=106, y=70 and z=106 (F127) are very advantageously used. The commercial non-ionic surfactants known as Pluronic (BASF), Tetronic (BASF), Triton (Sigma), Tergitol (Union Carbide), Brij (Aldrich) can be used as non-ionic surfactants in stages b) and f) of the main method according to the invention, respectively in stage b) of the simplified method according to the invention. For a four-block copolymer, two of the blocks consist of a poly(alkylene oxide) chain of hydrophilic nature and the other two blocks consist of a poly(alkylene oxide) chain of hydrophobic nature.

According to stages b) and f) of the main preparation method of the invention or to stage b) of the simplified preparation method of the invention, the colloidal solution in which zeolite crystals of maximum nanometric size equal to 300 nm are dispersed, optionally added to the mixture of stages b) and f) of the main preparation method of the invention, respectively to the mixture of stage b) of the simplified preparation method of the invention, is obtained either by prior synthesis, in the presence of a structuring agent, of zeolite nanocrystals of maximum nanometric size equal to 300 nm, or by the use of zeolite crystals exhibiting the characteristic of dispersing in form of nanocrystals of maximum nanometric size equal to 300 nm in solution, for example in acid aquo-organic solution. As regards the first variant consisting of a prior synthesis of the zeolite nanocrystals, the latter are synthesized according to operating protocols known to the person skilled in the art. In particular, the synthesis of beta zeolite nanocrystals has been described by T. Bein et al., *Micropor. Mesopor. Mater.*, 2003, 64, 165. The synthesis of Y zeolite nanocrystals has been described by T. J. Pinnavaia et al., *J. Am. Chem. Soc.*, 2000, 122, 8791. The synthesis of Faujasite zeolite nanocrystals has been described by Kloetstra et al., *Microporous Mater.*, 1996, 6, 287. The synthesis of ZSM-5 zeolite nanocrystals has been described by R. Mokaya et al., *J. Mater. Chem.*, 2004, 14, 863. The synthesis of Silicalite (or of MFI structural type) nanocrystals has been described in various publications: R. de Ruiter et al., *Synthesis of Microporous Materials*, Vol. I; M. L. Occelli, H. E. Robson (eds.), Van Nostrand Reinhold, New York, 1992, 167; A. E. Persson, B. J. Schoeman, J. Sterte, J.-E. Otterstedt, *Zeolites*, 1995, 15, 611-619. Zeolite nanocrystals are generally synthesized by preparing a reaction mixture containing at least one silicic source, optionally at least one source of at least one element T selected from among aluminium, iron, boron, indium and gallium, preferably at least one aluminic source and at least one structuring agent. The reaction mixture is either aqueous or aquo-organic, a water-alcohol mixture for example. The reaction mixture is advantageously brought under hydrothermal conditions under autogenous pressure, optionally by adding gas, nitrogen for example, at a temperature ranging between 50° C. and 200° C., preferably between 60° C. and 170° C., and more preferably at a temperature that does not exceed 120° C. until formation of zeolite nanocrystals. At the end of said hydrothermal treatment, a colloidal solution wherein the nanocrystals are in the dispersed state is obtained. The structuring agent can be ionic or neutral depending on the zeolite to be synthesized. Structuring agents from the following non-exhaustive list are frequently used: nitrogen-containing organic cations, elements from the alkaline family (Cs, K, Na, etc.), crown ethers, diamines, as well as any other structuring agent known to the person skilled in the art. As regards the second variant that consists in directly using zeolite crystals, the latter are synthesized by means of methods known to the person skilled in the art. Said zeolite crystals may already come in form of nanocrystals. It is also possible to advantageously use zeolite crystals of size above 300 nm, for example ranging between 300 nm and 200 μm, which are dispersed in solution, for example in aquo-organic solution, preferably in acid aquo-organic solution, in form of nanocrystals of maximum nanometric size equal to 300 nm. It is also possible to obtain zeolite crystals that disperse in form of nanocrystals of maximum nanometric size equal to 300 nm by carrying out functionalization of the nanocrystal surface. The zeolite crystals used are either in their as-synthesized form, i.e. still containing the structuring agent, or in their calcined form, i.e. freed of said structuring agent. When the zeolite crystals used are in their as-synthesized form, said structuring agent is removed during stage i) of the main preparation method according to the invention, respectively of the simplified preparation method according to the invention.

The solution in which are mixed at least one surfactant, at least one precursor of at least said element X, at least one colloidal solution of metallic nanoparticles obtained according to a), and optionally at least one stable colloidal solution in which zeolite crystals of maximum nanometric size equal to 300 nm are dispersed, according to stages b) and f) of the main preparation method of the invention or according to stage b) of the simplified preparation method of the invention, can be acidic, neutral or basic. Preferably, said solution is acidic and it has a maximum pH value of 3, preferably ranging between 0 and 2. The acids used to obtain an acidic solution of maximum pH value equal to 3 are, by way of non-exhaustive example, hydrochloric acid, sulfuric acid and nitric acid. Said solutions according to stages b) and f) of the main preparation method of the invention, respectively said solution according to stage b) of the simplified preparation method of the invention, can be aqueous or they can be a mixture of water and organic solvent, the organic solvent being preferably a water-miscible polar solvent such as THF or an alcohol, in the latter case preferably ethanol. Said solutions according to stages b) and f) of the main preparation method of the invention, respectively said solution according to stage b) of the simplified preparation method of the invention, can also be practically organic, preferably practically alcoholic, the proportion of water being such that hydrolysis of the inorganic precursors is ensured (stoichiometric amount). More preferably, said solutions according to stages b) and f) of the main preparation method of the invention, respectively said solution according to stage b) of the simplified preparation method of the invention in which are mixed at least one surfactant, at least one precursor of at least said element X, at least one colloidal solution of metallic nanoparticles obtained according to stage a) (main or simplified method according to the invention), and optionally at least one stable colloidal solution in which zeolite crystals or maximum nanometric size equal to 300 nm are dispersed, are acidic aquo-organic mixtures, more preferably acidic water-alcohol mixtures.

The amount of metallic nanoparticles comprising at least one metal belonging to the transition metal family (columns 3 to 12 of the periodic table according to the IUPAC classification) and/or to the rare earth metal family (lanthanides and actinides) is such that said metallic nanoparticles advantageously represent 0.1 to 30 wt. %, preferably 0.1 to 20 wt. % and more preferably 0.1 to 10 wt. % of the material according to the invention.

The amount of zeolite nanocrystals dispersed in the colloidal solution, obtained according to the variant with prior synthesis, in the presence of a structuring agent, of zeolite nanocrystals of maximum nanometric size equal to 300 nm or according to the variant using zeolite crystals, which have the characteristic of dispersing in form of nanocrystals of maximum nanometric size equal to 300 nm in solution, for example in acidic aquo-organic solution, possibly introduced in stages b) and f) of the main preparation method of the invention, respectively in stage b) of the simplified preparation method of the invention, is such that the zeolite nanocrystals advantageously represent 0.1 to 30 wt. %, preferably 0.1 to 20 wt. % and more preferably 0.1 to 10 wt. % of the material according to the invention.

The initial concentration in surfactant introduced in the mixture according to stages b) and f) of the main preparation method of the invention, respectively in stage b) of the simplified preparation method of the invention, is defined by $c_0$ and $c_0$ is defined in relation to the critical micelle concentration ($c_{mc}$) known to the person skilled in the art. $c_{mc}$ is the limit concentration above which the phenomenon of self-assembly of the surfactant molecules in the solution occurs. Concentration $c_0$ can be less than, equal to or greater than $c_{mc}$, preferably it is less than $c_{mc}$. In a preferred embodiment of the preparation of the material according to the invention, concentration $c_0$ is less than $c_{mc}$ and said solution according to stage b), respectively the solution according to stage f) of the main preparation method of the invention or the solution according to stage b) of the simplified preparation method of the invention is an acidic water-alcohol mixture. In cases where the solution according to stages b) and f) of the main preparation method of the invention, respectively stage b) of the simplified preparation method of the invention, is a water-organic solvent mixture, preferably acidic, it is preferred in stages b) and f) of the main preparation method of the invention or in stage b) of the simplified preparation method according to the invention that the surfactant concentration at the origin of the matrix mesostructuration be lower than the critical micelle concentration, so that the evaporation of the aquo-organic solutions, preferably acidic, in stages c) and g) of the main preparation method according to the invention, or so that the evaporation of the aquo-organic solution, preferably acidic, in stage c) of the simplified preparation method according to the invention, by means of the aerosol technique, induces a micellization or self-assembly phenomenon leading to the mesostructuration of the matrix of the material according to the invention around the metallic nanoparticles, and possibly the zeolite nanocrystals that remain unchanged in their shape and size during stages c), g) and d), h) of the main preparation method according to the invention or stages c) and d) of the simplified preparation method according to the invention. When $c_0 < c_{mc}$, the mesostructuration of the matrix of the material according to the invention prepared according to the main preparation method of the invention described above or according to the simplified preparation method of the invention described above is the result of a progressive concentration, within each droplet, of at least the precursor of said element X and of the surfactant, up to a surfactant concentration $c_0 > c_{mc}$ resulting from an evaporation of the aquo-organic solution, preferably acidic.

In general terms, the combined concentration increase of at least one precursor of at least one element X, hydrolyzed, and of the surfactant causes precipitation of at least said hydrolyzed precursor of said element X around the self-organized surfactant and, consequently, the structuration of the matrix of the material according to the invention. The inorganic/inorganic phase, organic/organic phase and organic/inorganic phase interactions lead, through a cooperative self-assembly mechanism, to the condensation of at least said precursor of said hydrolyzed element X around the self-organized surfactant. During this self-assembly phenomenon, the metallic nanoparticles and optionally the zeolite nanocrystals are trapped in said mesostructured matrix based on an oxide of at least one element X present in each elementary spherical particle making up the material according to the invention.

Using spray nozzles is particularly advantageous for constraining the reactants present in stages c) and g) of the main method according to the invention or present in stage c) of the simplified method according to the invention to interact with one another, no loss of matter, except for the solvents, i.e. the solution, preferably the aqueous solution, preferably acidic, and to which a polar solvent has possibly been added, being possible, all of element X and of the metallic nanoparticles, optionally of the zeolite nanocrystals, initially present being thus perfectly preserved throughout the preparation of the material according to the invention, instead of being potentially eliminated during the filtering and washing stages encountered in conventional synthesis methods known to the person skilled in the art.

Obtaining spherical elementary particles of diameter D such that $10<D$ (μm)$\leq 100$ by means of the EISA method, in particular using the aerosol technique, specific to the invention requires increased knowledge and control of the synthesis operating parameters, essentially for stages b), c), f) and g) of the main preparation method according to the invention or stages b) and c) of the simplified method according to the invention, in order to maintain the mesostructuration process through self-assembly of the surfactant jointly with the hydrolysis/condensation reactions of the various inorganic precursors. In fact, the production of droplets of diameter less than or equal to 300 μm leads to kinetics of evaporation of the aquo-organic solution or suspension that are all the slower since the droplet is large (because proportional to the square of the diameter of the drop to be evaporated). If the total evaporation time is slower than the condensation time of the organic matter on the periphery of the drop, a layer of condensed material forms at the evaporation interface, thus forming an additional evaporation barrier. If this additional layer becomes rigid before enough solvent, i.e. water to which an organic solvent has possibly been added, has evaporated, the ratio of the volume of the polar constituents to the volume of the apolar constituents in the mixtures according to stages b) and f) of the main method of the invention or in the mixture according to stage b) of the simplified method of the invention denoted by $V_{pol}/V_{apol}=(V_{inorg}+V_{solvent}+V_{org\ polar})/(V_{org\ hydrophobic})$, a critical parameter that conditions the appearance of a mesostructuration, is variable between the "rigid surface film" and "particle core" zones (with $V_{inorg}=m_{inorg}/\rho_{inorg}$ as defined above in the present description and $V_{org\ polar}+V_{org\ hydrophobic}=V_{org}$ also as defined above in the present description and $V_{solvent}$=total volume of solvent, the solvent being made up of water and optionally an organic solvent, $V_{org\ polar}$=volume of the polar parts of the organic reactants, $V_{org\ hydrophobic}$=volume of the apolar parts of the organic reactants). At the core, the elements present then have to accommodate the mesostructuration to a total volume (defined by the volume inscribed in the rigid skin) greater than the optimum value. If ratio $V_{pol}/V_{apol}$ is too far from the optimum mesostructuration value, the mesostructure homogeneity of the particles produced deteriorates and can disappear to form particles consisting of a well-mesostructured skin and not of a non-mesostructured core (amorphous or resulting from a spinodal decomposition depending on the constituent elements and solvents used). In order to avoid this phenomenon likely to impede the elaboration of the material according to the invention, the volume of solvent to be evaporated has to be limited in stages c) and g) of the main method according to the invention, respectively in stage c) of the simplified method according to the invention, in other words, the aerosoled solutions have to be concentrated in order to work preferably with a value $c_0$ close to or greater than $c_{mc}$. This is translated into the presence of non-volatile compounds in the suspension according to stage f) of the main preparation method of the invention and in the solution according to stage b) of the simplified preparation method of the invention, in such an amount that the volume percentage of said compounds present in said suspension, respectively said solution, is at least 7%. The maximum value of this volume percentage is specific to each system and it is mainly limited by three criteria: (i) the lack of stability of the solutions obtained in stages b) and f) of the main method of the invention, respectively in stage b) of the simplified method of the invention, (ii) the spontaneous precipitation of the solution at too high concentrations (either through lack of solubility of one or more constituents, or through condensation reaction of the inorganic constituents present in solutions obtained in stages b) and f) of the main method of the invention, respectively in stage b) of the simplified method of the invention), and (iii) the rheological properties of the solutions obtained in stages b) and f) of the main method of the invention, respectively in stage b) of the simplified method of the invention, which may become unsuitable for droplet formation by the spray nozzles (viscosity too high for example).

The solution atomization stage according to stages c) and g) of the main preparation method of the invention or the solution atomization stage according to stage c) of the simplified preparation method of the invention produces spherical droplets of diameter less than or equal to 300 µm by using a spray nozzle, and said nozzle can be "mono-fluid" or "bi-fluid" (with control of the pressure of a gas such as compressed air or nitrogen) as it is well known to the person skilled in the art. For example, nozzles from Spraying System Emani can be used ("mono-fluid" nozzle of N22® type or "bi-fluid" of SU4® type for example). The size distribution of these droplets is of lognormal type. Atomization of the solution is carried out in a chamber into which a carrier gas, a dry air/nitrogen mixture for smaller plants and nitrogen alone for larger ones, is sent. According to stages d) and h) of the main preparation method of the invention or according to stage d) of the simplified method of the invention, said droplets are dried. Drying is performed through contact of said droplets with the aforementioned gas, which leads to the progressive evaporation of the solution, respectively of the suspension, for example of the acidic aquo-organic solution, respectively of the acidic aquo-organic suspension, obtained in stage b), respectively stage f) of the main preparation method according to the invention or the progressive evaporation of the solution obtained in stage b) of the simplified preparation method according to the invention, and thus to spherical elementary particles. The outlet temperature providing drying in the atomizer chamber ranges between 80° C. and 250° C. The distribution of the residence time of the droplets or of the particles in the atomization chamber is of the order of some seconds. During stage e) of the main method of the invention, the particles are crushed (air jet mill Netzsch CGS10 for example) and brought down to some µm (3 to 5 µm in general). Depending on the installation, the particles are collected at the outlet of a cyclone or in a bag filter. Drying of the particles according to stages d) and h) of the main method of the invention or according to stage d) of the simplified preparation method of the invention is advantageously followed by an additional thermal treatment at a temperature ranging between 50° C. and 300° C. prior to eliminating the surfactant in stage of the main method of the invention or of the simplified method of the invention so as to obtain the mesostructured-porosity material according to the invention. Said elimination of the surfactant introduced in stages b) and f) of the main method according to the invention or in stage b) of the simplified method according to the invention is advantageously carried out using chemical extraction processes or thermal treatments, preferably calcination in air in a temperature range from 300° C. to 1000° C., and more precisely in a range from 300° C. to 600° C., during 1 to 24 hours, preferably during 2 to 6 hours.

The mesostructured material according to the invention, consisting of elementary spherical particles comprising metallic nanoparticles trapped in a mesostructured oxide matrix, can be obtained in form of powder, balls, pellets, granules or extrudates, the shaping operations being performed using conventional techniques known to the person skilled in the art. Preferably, the material according to the invention is obtained in form of a powder consisting of elementary spherical particles having a diameter D such that 10<D (µm)≤100, which facilitates a possible reactant diffusion if the material according to the invention is used in a potential industrial application.

The mesostructured material according to the invention, consisting of elementary spherical particles comprising metallic nanoparticles trapped in a mesostructured oxide matrix, of organized and uniform porosity in the mesoporosity domain, is characterized by means of several analysis techniques, notably small-angle X-ray diffraction (SAXD), wide-angle X-ray diffraction (WARD), nitrogen volumetric analysis (BET), transmission electron microscopy (TEM), scanning electron microscopy (SEM) and inductively coupled plasma emission spectrometry (ICP).

The small-angle X-ray diffraction technique (values of angle 2θ ranging between 0.5° and 6°) allows to characterize the periodicity, on the nanometric scale, generated by the organized mesoporosity of the mesostructured matrix of the material according to the invention. In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle 2θ are associated with the inter-reticular distances $d_{(hkl)}$ characteristic of the structural symmetry of the material, ((hkl) being the Miller indices of the reciprocal network) by the Bragg relation: 2 $d_{(hkl)}/\sin(\theta)=n*\lambda$. This indexing then allows to determine the cell parameters (abc) of the direct network, the value of these parameters being a function of the hexagonal, cubic, vermicular, cholesteric, lamellar or bicontinuous structure obtained. For example, the small-angle X-ray diffractogram of a mesostructured material according to the invention consisting of elementary spherical particles comprising an oxide mesostructured matrix based on silicon and aluminium obtained according to the main preparation method of the invention or the simplified preparation method of the invention via the use of a quaternary ammonium salt such as cethyltrimethylammonium bromide $CH_3(CH_2)_{15}N(CH_3)_3Br$ (CTAB) has a perfectly resolved correlation peak corresponding to the correlation distance between pores d characteristic of a structure of vermicular type and defined by the Bragg relation 2 $d_{(hkl)}*\sin(\theta)=n*\lambda$. The wide-angle X-ray diffraction technique (values of angle 2θ ranging between 5° and 100°) allows to characterize a crystallized solid defined by the repetition of a unit motif or elementary cell on the molecular scale. It follows the same physical principle as the one that governs the small-angle X-ray diffraction technique. The wide-angle XRD technique is thus used to analyze the materials of the invention because it is particularly well-suited for structural characterization of the metallic nanoparticles that can be crystallized, and possibly the zeolite nanocrystals present in each elementary spherical particle making up the material defined according to the invention. In particular, it allows to have access to the pore size of the zeolite nanocrystals when they are present. For example, a mesostructured material according to the invention, obtained according to the main preparation method of the invention or according to the simplified preparation method of the invention, consisting of elementary spherical particles comprising iron oxide metallic nanoparticles γ-$Fe_2O_3$ trapped in an oxide mesostructured matrix based on silicon and aluminium, obtained via the use of a quaternary ammonium salt such as cethyltrimethylammonium bromide $CH_3(CH_2)_{15}N(CH_3)_3Br$ (CTAB) exhibits, in wide-angle XRD, the diffractogram associated with the group of symmetry fd3m of the iron oxide nanoparticles crystallized at the wide angles and, in small-angle XRD, a correlation peak perfectly resolved at the small angles, associated with the vermicular type structure of the mesostructured matrix that corresponds to a correlation distance d between the pores. In case of the possible presence of zeolite nanocrystals trapped in said oxide mesostructured matrix, for example ZSM-5 (MFI) type zeolite nanocrystals, the wide-angle diffractogram exhibits, in addition to the peaks associated with said iron oxide metallic nanoparticles, the peaks assigned to the group of symmetry Pnma (No. 62) of the ZSM-5 zeolite. The angle value obtained in the XR diffractogram allows to find the correlation distance d according to the Bragg law: $2 d_{(hkl)} *\sin(\theta)=n*\lambda$.

Nitrogen volumetric analysis, which corresponds to the physical adsorption of nitrogen molecules in the pores of the material via a progressive pressure increase at constant temperature, provides information on the particular textural characteristics (pore diameter, porosity type, specific surface area) of the material according to the invention. In particular, it allows to know the specific surface area and the mesopore distribution of the material. What is referred to as the specific surface area is the BET specific surface area ($S_{BET}$ in $m^2/g$) determined by nitrogen adsorption according to the ASTM D 3663-78 standard established from the Brunauer-Emmett-Teller method described in "*The Journal of American Society*", 1938, 60, 309. The pore distribution representative of a mesopore population centered in a 1.5-50 nm range is determined by means of the Barrett-Joyner-Halenda (BJH) model. The nitrogen adsorption-desorption isotherm according to the BJH model thus obtained is described in "*The Journal of American Society*", 1951, 73, 373, written by E. P. Barrett, L. G. Joyner and P. P. Halenda. In the description that follows, the mesopore diameter $\phi$ of the mesostructured matrix corresponds to the mean diameter by nitrogen adsorption defined as a diameter such that all the pores having a size below this diameter make up 50% of the pore volume (Vp) measured on the adsorption branch of the nitrogen isotherm. Furthermore, the shape of the nitrogen adsorption isotherm and of the hysteresis loop can give information about the nature of the mesoporosity and the possible presence of microporosity essentially linked with the zeolite nanocrystals when they are present in the mesostructured oxide matrix. For example, the nitrogen adsorption isotherm relative to a mesostructured material according to the invention, obtained according to the main preparation method of the invention or according to the simplified preparation method of the invention, consisting of elementary spherical particles comprising an oxide mesostructured matrix based on aluminium and silicon prepared via the use of a quaternary ammonium salt such as cethyltrimethyl-ammonium bromide $CH_3(CH_2)_{15}N(CH_3)_3Br$ (CTAB), is characterized by an adsorption isotherm of class ivc with presence of an adsorption step for P/P0 values (where P0 is the saturated vapour pressure at temperature T) ranging between 0.2 and 0.3, associated with the presence of pores of the order of 2 to 3 nm as confirmed by the associated pore distribution curve.

Concerning the mesostructured matrix, the difference between the value of the pore diameter $\phi$ and the cell parameter a defined by small-angle XRD as described above allows to have access to quantity e where $e=a-\phi$ and it is characteristic of the thickness of the amorphous walls of the mesostructured matrix contained in each spherical particle of the material according to the invention. Said cell parameter a is related to the correlation distance d between pores by a geometrical factor characteristic of the geometry of the phase. For example, in the case of a hexagonal cell $e=a-\phi$ with $a=2*d/\sqrt{3}$, in the case of a vermicular structure $e=d-\phi$.

Transmission electron microscopy (TEM) analysis is also a commonly used technique for characterizing the structure of these materials. It allows formation of an image of the solid studied, the contrasts observed being characteristic of the structural organization, the texture or the morphology of the particles observed, the resolution of the technique reaching 0.2 nm maximum. In the description hereafter, the TEM photos are obtained from michrotome sections of the sample in order to visualize a section of an elementary spherical particle of the material according to the invention. For example, the TEM images obtained for a material according to the invention, obtained according to the main preparation method of the invention or according to the simplified preparation method of the invention, consisting of spherical particles comprising gold metallic nanoparticles of zero oxidation degree trapped in a mesostructured matrix based on titanium oxide prepared via the use of a quaternary ammonium salt such as cethyltrimethylammonium bromide $CH_3(CH_2)_{15}N(CH_3)_3Br$ (CTAB), exhibit within a single spherical particle a vermicular mesostructure (the matter being defined by dark zones) within which are visualized opaque objects representing the gold metallic nanoparticles trapped in the mesostructured matrix. Analysis of the image also allows to have access to parameters d, $\phi$ and e, characteristic of the mesostructured matrix, defined above. It is sometimes possible to also visualize in this image the reticular planes of the metallic nanoparticles, which can be crystallized, instead of the aforementioned opaque objects, as well as the zeolite nanocrystals when they are present in the mesostructured matrix, and thus to have access to their crystallographic structure.

The morphology and the size distribution of the elementary particles were established by analysis of photos obtained by scanning electron microscopy (SEM).

The structure of the mesostructured matrix contained in each particle of the material according to the invention can be cubic, vermicular, hexagonal, lamellar, cholesteric or bicontinuous, depending on the nature of the surfactant selected as the structuring agent.

The invention is illustrated by the following examples.

EXAMPLES

In the examples hereafter, the aerosol technique used is the technique described above in the description of the invention.

Example 1

Preparation of a Material Having Gold Metallic Nanoparticles Corresponding to 3 wt. % of the Final Material Trapped in a Titanium Oxide $TiO_2$ Mesostructured Matrix (Main Preparation Method According to the Invention)

1 mole Brij 58 is dissolved in 10 kg ethanol at ambient temperature. 2.4 kg $TiCl_4$ are added to this solution under vigorous stirring. 11.1 liters of a 0.014 $mol.l^{-1}$ gold colloid solution (J. Turkevitch, P. C. Stevenson, J. Hillier, *Discuss. Faraday Soc.*, 1951, 11, 55) are concentrated by centrifugation at 2.2 liters (0.071 mol/l) and slowly added to the previous $TiCl_4$-based solution. The assembly is subjected to ultrasound for approximately one minute, then atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage d) of the main method of the invention. The particles are collected in a bag filter. Said particles are crushed by means of a jet mill and brought down to some $\mu m$ (3 to 5 $\mu m$). A 30 wt. % fraction of these crushed particles is then fed again into a solution having the same formulation as the initial solution, then the suspension is atomized again by means of a "mono-fluid" nozzle, as above, and the droplets dried at 100° C. according to the protocol described in the description of the invention above according to stage h) of the main method of the invention. The powder collected in a bag filter is then calcined in air for 5 hours at T=550° C. The volume percentage of non-volatile compounds present in the suspension prior to the second atomization (stage f) of the main method according to the invention is 11.2%. The solid is characterized by small-angle and wide-angle XRD, nitrogen volumetric analysis, TEM and SEM. The TEM analysis shows that the final material consists of gold nanoparticles trapped in a titanium oxide matrix with organized mesoporosity characterized by a vermicular structure. Nitrogen volumetric analysis leads to a specific surface area of the final material $S_{BET}$=220 m²/g and to a mesopore diameter characteristic of the titanium oxide mesostructured matrix of $\phi$=2.6 nm. The wide-angle XRD analysis leads to the diffractogram characteristic of the gold nanoparticles of mean size 19 nm. The small-angle XRD analysis leads to the visualization of a correlation peak associated with the vermicular organization of the mesostructured matrix. The Bragg relation gives 2 d*sin(1)=1.5406, i.e. d=4.4 nm. The thickness of the amorphous walls of the mesostructured matrix defined by e=d–$\phi$ thus is e=1.8 nm. A SEM image of the spherical elementary particles thus obtained shows that these particles have a size characterized by a diameter ranging between 15 and 100 μm, the size distribution of these particles being around 50 μm.

Example 2

Preparation of a Material Having Cerium Oxide Nanoparticles Corresponding to 8 wt. % of the Final Material Trapped in an Oxide Mesostructured Matrix Based on Zirconium and Silicon of Molar Ratio Si/Zr=4 (Main Preparation Method According to the Invention)

1.1 kg $ZrCl_4$ are added very slowly to 7 kg ethanol at ambient temperature. 7 kg $H_2O$ are then added very slowly under vigorous stirring. 1.5 kg CTAB are added thereafter, then, still very slowly, 4 kg tetraethylorthosilicate (TEOS). 3 l of a cerium oxide solution concentrated at 0.3 mol/l (the particles of cerium oxide $CeO_2$ are supplied in form of an aqueous solution with 60 mass % cerium oxide by the Rhodia Company) are then added to the solution containing the inorganic precursor $ZrCl_4$. The solution thus obtained is atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage d) of the main method of the invention. The particles are collected in a bag filter. Said particles are crushed by means of a jet mill and brought down to some μm (3 to 5 μm). A 30 wt. % fraction of these crushed particles is then fed again into a solution having the same formulation as the initial solution, then the suspension is atomized again by means of a "mono-fluid" nozzle, as above, and the droplets dried at 100° C. according to the protocol described in the description of the invention above according to stage h) of the main method of the invention. The powder collected in a bag filter is then calcined in air for 5 hours at T=550° C. so as to eliminate the surfactant CTAB. The volume percentage of non-volatile compounds present in the suspension prior to the second atomization (stage f) of the main method according to the invention is 12.4%. The solid is characterized by small-angle and wide-angle XRD, nitrogen volumetric analysis, TEM, SEM and ICP. The TEM analysis shows that the final material consists of cerium oxide nanoparticles in a $SiO_2$—$ZrO_2$ matrix of molar ratio Si/Zr=4, of organized mesoporosity characterized by a vermicular structure. Nitrogen volumetric analysis leads to a specific surface area of the final material $S_{BET}$=430 m²/g and to a mesopore diameter characteristic of the mesostructured matrix of $\phi$=2.0 nm. The wide-angle XRD analysis leads to the diffractogram characteristic of the cerium oxide nanoparticles of size 3 nm. The small-angle XRD analysis leads to the visualization of a correlation peak associated with the vermicular organization of the mesostructured matrix. The Bragg relation gives 2 d*sin(1.9)=1.5406, i.e. d=5 nm. The thickness of the amorphous walls of the mesostructured matrix defined by e=d–$\phi$ thus is e=3 nm. A SEM image of the spherical elementary particles thus obtained shows that these particles have a size characterized by a diameter ranging between 15 and 100 μm, the size distribution of these particles being around 50 μm.

Example 3

Preparation of a Material Having Polymetallic $CoFe_2O_4$ Nanoparticles of Inverse Spinel Structure Corresponding to 5 wt. % of the Final Material Trapped in an Oxide Mesostructured Matrix Based on Aluminium and Silicon of Molar Ratio Si/Al=4 (Main Preparation Method According to the Invention)

1.0 kg $AlCl_3,6H_2O$ are added to a solution containing 5 kg ethanol, 2 kg $H_2O$, 36 ml HCl and 1.4 kg P123. Once the aluminium chloride dissolved, 3.6 kg TEOS are added to this solution. 9.5 l of a $FeCo_2O_4$ nanoparticle solution concentrated at 0.03 mol/l in 1,2-propanediol, prepared according to the protocol described in the literature (S. Ammar, A. Helfen, N. Jouini, F. Fiévet, I. Rosenman, F. Villain, P. Molinié, M. Danot, *J. Mater. Chem.*, 2001, 11, 186), are then added. The solution thus obtained is atomized by means of a "mono-fluid" spray nozzle in a chamber into which a carrier gas, a dry air/nitrogen mixture, is sent. The droplets obtained by atomization are dried at 100° C. according to the protocol described in the above description of the invention, in accordance with stage d) of the main method of the invention. The particles are collected in a bag filter. Said particles are crushed by means of a jet mill and brought down to some μm (3 to 5 μm). A 30 wt. % fraction of these crushed particles is then fed again into a solution having the same formulation as the initial solution, then the suspension is atomized again by means of a "mono-fluid" nozzle, as above, and the droplets dried at 100° C. according to the protocol described in the description of the invention above according to stage h) of the main method of the invention. The powder collected in a bag filter is then calcined in air for 5 hours at T=550° C. so as to eliminate the surfactant P123. The volume percentage of non-volatile compounds present in the suspension prior to the second atomization (stage f) of the main method according to the invention is 10.6%. The solid is characterized by small-angle and wide-angle XRD, nitrogen volumetric analysis, TEM, SEM and ICP. The TEM analysis shows that the final material consists of $CoFe_2O_4$ nanoparticles trapped in an aluminosilicate matrix of organized mesoporosity characterized by a vermicular structure. Nitrogen volumetric analysis leads to a specific surface area of the final material $S_{BET}$=300 m²/g and to a mesopore diameter characteristic of the mesostructured matrix of $\phi$=5.6 nm. The wide-angle XRD analysis leads to the diffractogram characteristic of the $CoFe_2O_4$ nanoparticles of size 5 nm. The small-angle XRD analysis leads to the visualization of a correlation peak associated with the vermicular organization of the mesostructured matrix. The Bragg relation gives 2 d*sin (0.32)=1.5406, i.e. d=13.1 nm.

The thickness of the amorphous walls of the mesostructured matrix defined by e=d−φ thus is e=7.5 nm. A SEM image of the spherical elementary particles thus obtained shows that these particles have a size characterized by a diameter ranging between 15 and 100 µm, the size distribution of these particles being around 50 µm.

The invention claimed is:

1. An inorganic material comprising at least two elementary spherical particles, each one of said spherical particles comprising metallic nanoparticles of size ranging between 1 and 300 nm and a mesostructured matrix based on an oxide of at least one element X that is silicon, aluminium, titanium, tungsten, zirconium, gallium, germanium, tin, antimony, lead, vanadium, iron, manganese, hafnium, niobium, tantalum, yttrium, cerium, gadolinium, europium neodymium, or a mixture of at least two of these elements, said mesostructured matrix having a pore diameter ranging between 1.5 and 30 nm and having amorphous walls of thickness ranging between 1 and 30 nm, said elementary spherical particles having a diameter D greater than 10 µm and less than or equal to 100 µm.

2. A material as claimed in claim 1, such that said spherical particles have a diameter D ranging between 11 and 70 µm.

3. A material as claimed in claim 2, such that said spherical particles have a diameter D ranging between 11 and 50 µm.

4. A material as claimed in claim 3, such that said spherical particles have a diameter D ranging between 15 and 50 µm.

5. A material as claimed in claim 1, such that element X is silicon, aluminium, titanium, zirconium, gallium, germanium, cerium, or a mixture of at least two of these elements.

6. A material as claimed in claim 1, such that the pore diameter of said matrix ranges between 1.5 and 10 nm.

7. A material as claimed in claim 1, such that said mesostructured matrix has a hexagonal, cubic, vermicular, lamellar, cholesteric or bicontinuous structure.

8. A material as claimed in claim 1, such that said mesostructured matrix is based on a silicon oxide and an aluminium oxide or on a silicon oxide and a zirconium oxide.

9. A material as claimed in claim 1, such that said metallic nanoparticles comprise at least one metal belonging to the transition metal family and/or to the rare earth metal family.

10. A material as claimed in claim 9, such that said metallic nanoparticles comprise at least one transition metal of zero oxidation degree that is gold, palladium, platinum, nickel, cobalt, copper, silver, rhodium, ruthenium, iron, iridium, mixtures thereof or derived alloys thereof.

11. A material as claimed in claim 9, such that said metallic nanoparticles comprise at least one transition metal oxide and/or at least one rare earth metal oxide, wherein said metal is: Ti, Zr, Nb, Ta, Mo, W, Fe, Co, Cu, Y, La, Ni, Cr, Pd, Pt, Ce, Eu, Nd, Gd or mixtures thereof.

12. A material as claimed in claim 9, such that said metallic nanoparticles comprise at least one polymetallic oxide with a crystallographic structure of spinel $AB_2O_4$, perovskite $ABO_3$ or ilmenite $ABO_3$ type, A and/or B being at least one transition and/or rare earth metal.

13. A material as claimed in claim 9, such that said metallic nanoparticles comprise at least one chalcogenide made up of a transition metal M and a chalcogen element C that is sulfur, selenium or tellurium.

14. A material as claimed in claim 1, such that said metallic nanoparticles represent 0.1 to 30 wt. % of said material.

15. A material as claimed in claim 1, such that each one of said spherical nanoparticles comprises zeolite nanocrystals.

16. A material as claimed in claim 15, such that said zeolite nanocrystals have a pore opening size ranging between 0.2 and 2 nm.

17. A material as claimed in claim 15, such that said zeolite nanocrystals comprise at least one zeolite of MFI, BEA, FAU or LTA structure.

18. A material as claimed in claim 15, such that said zeolite nanocrystals comprise at least one entirely silicic zeolite.

19. A material as claimed in claim 15, such that said zeolite nanocrystals comprise at least one zeolite containing silicon and aluminium.

20. A material as claimed in claim 1, such that it has a specific surface area ranging between 100 and 1100 $m^2/g$.

21. A method of preparing a material as claimed claim 1, comprising: a) synthesizing metallic particles of maximum nanometric size equal to 300 nm in order to obtain a stable colloidal solution in which said nanoparticles are dispersed; b) mixing into a solution at least one surfactant, at least one precursor of at least one element X that is silicon, aluminium, titanium, tungsten, zirconium, gallium, germanium, tin, antimony, lead, vanadium, iron, manganese, hafnium, niobium, tantalum, yttrium, cerium, gadolinium, europium or neodymium, at least one stable colloidal solution of metallic nanoparticles obtained according to a), and optionally at least one stable colloidal solution in which zeolite crystals of maximum nanometric size equal to 300 nm are dispersed; c) aerosol atomizing the solution obtained in stage b) using a spray nozzle that leads to the formation of liquid droplets of diameter less than or equal to 300 µm; d) drying said droplets; e) crushing the solid product obtained in stage d); f) mixing into a solution at least one surfactant, at least one precursor of at least one element X that is silicon, aluminium, titanium, tungsten, zirconium, gallium, germanium, tin, antimony, lead, vanadium, iron, manganese, hafnium, niobium, tantalum, yttrium, cerium, gadolinium, europium or neodymium, at least one stable colloidal solution of metallic nanoparticles obtained according to a), optionally at least one stable colloidal solution in which zeolite crystals of maximum nanometric size equal to 300 nm are dispersed and at least a fraction of the solid product obtained in stage e) so as to form a suspension; g) aerosol atomizing the solution obtained in stage f) using a spray nozzle that leads to the formation of suspended droplets, which are precursors of the constituent spherical elementary particles, of diameter D such that 10<D (µm)≤100, of the material according to the invention; h) drying said droplets obtained in stage g) and i) removing said surfactant introduced in stages b) and f) so as to obtain a mesostructured material in which metallic nanoparticles are trapped.

22. A preparation method as claimed in claim 21, such that the volume percentage of non-volatile compounds present in the suspension according to said stage f) is at least 7%.

23. A method of preparing a material as claimed in claim 3, comprising: a) synthesizing metallic particles of maximum nanometric size equal to 300 nm in order to obtain a stable colloidal solution in which said nanoparticles are dispersed; b) mixing into a solution at least one surfactant, at least one precursor of at least one element X that is silicon, aluminium, titanium, tungsten, zirconium, gallium, germanium, tin, antimony, lead, vanadium, iron, manganese, hafnium, niobium, tantalum, yttrium, cerium, gadolinium, europium or neodymium, at least one stable colloidal solution of metallic nanoparticles obtained according to a), and optionally at least one stable colloidal solution in which zeolite crystals of maximum nanometric size equal to 300 nm are dispersed; c) aerosol atomizing the solution obtained in stage b) using a spray nozzle that leads to the formation of liquid droplets of diameter less than or equal to 300 µm; d) drying said droplets; and i) removing said surfactant introduced in stage b) so as to obtain a mesostructured material in which metallic nanoparticles are trapped.

24. A preparation method as claimed in claim 23, such that the volume percentage of non-volatile compounds present in the suspension according to said stage b) is at least 7%.

* * * * *